United States Patent [19]

Kowdley et al.

[11] Patent Number: 5,465,497

[45] Date of Patent: Nov. 14, 1995

[54] CONTROL ROD DRIVE UNCOUPLING TOOL GAGE

[75] Inventors: Balasubramanian S. Kowdley; Thomas A. Lewis; Robert S. Tsukida; Edward W. Saxon; Frank Ortega, all of San Jose; Paul Debenedetto, Grass Valley, all of Calif.

[73] Assignee: General Electric Company, San Jose, Calif.

[21] Appl. No.: 199,408

[22] Filed: Feb. 22, 1994

[51] Int. Cl.$^6$ .............................. G01B 7/14; G21C 17/00
[52] U.S. Cl. .................. 33/626; 33/502; 33/555; 376/258
[58] Field of Search ................. 33/626, 502, 613, 33/549, 555, DIG. 1; 376/258

[56] References Cited

U.S. PATENT DOCUMENTS

| | | | |
|---|---|---|---|
| 4,604,576 | 8/1986 | Barrault | 376/258 |
| 4,623,507 | 11/1986 | Gravelle | 376/258 |
| 5,076,996 | 12/1991 | Miyaguchi et al. | 376/258 |
| 5,224,275 | 7/1993 | Salzberg | 33/555 |
| 5,333,160 | 7/1994 | Runde | 376/258 |

*Primary Examiner*—Christopher W. Fulton
*Attorney, Agent, or Firm*—James E. McGinness

[57] ABSTRACT

A method and a gage for testing uncoupling tools to ensure proper operation prior to use. The uncoupling tool gage simulates the actual conditions under which the uncoupling tool is expected to perform. The gage has a cylindrical guide for slidably receiving a magnet housing. The guide is supported such that it is concentric with respect to the probe of an uncoupling tool to be checked. The magnet housing is placed inside the cylindrical guide and then moved toward the bottom thereof. When the magnet moves into proximity with a switch in the uncoupling tool probe, an indicator lamp in the uncoupling tool illuminates. If the face of the magnet housing is within a range band on the outside of the guide when the indicator is illuminated, then the uncoupling tool is operating properly.

8 Claims, 9 Drawing Sheets

CONTROL ROD DRIVE UNCOUPLING TOOL GAGE

FIELD OF THE INVENTION

This invention relates generally to maintenance of control rod drives in boiling water reactors. In particular, the invention relates to tools for uncoupling a control rod from a control rod drive prior to a maintenance operation.

BACKGROUND OF THE INVENTION

Figure 1:
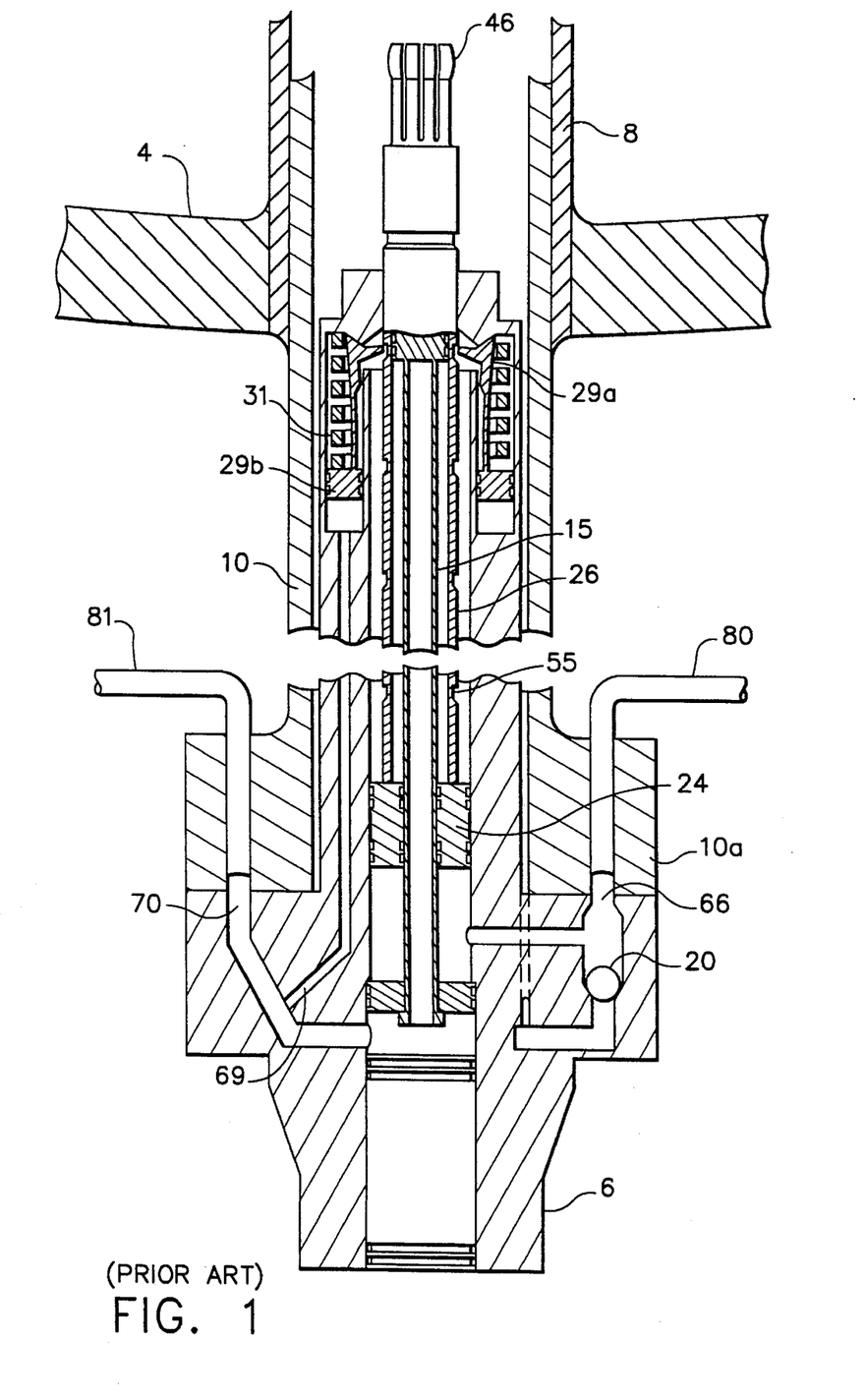
FIG. 1 is a sectional schematic of a conventional control rod drive installed in a BWR.

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains a withdraw port 70 and an insert port 66 with an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, the check valve directs external hydraulic pressure or reactor pressure to the underside of drive piston 24. When higher than the external hydraulic pressure, reactor pressure is admitted to the two-way check valve from the annular space between the CRD and a thermal sleeve (not shown) through passages in the CRD flange, called scram vessel ports.

Figure 2:
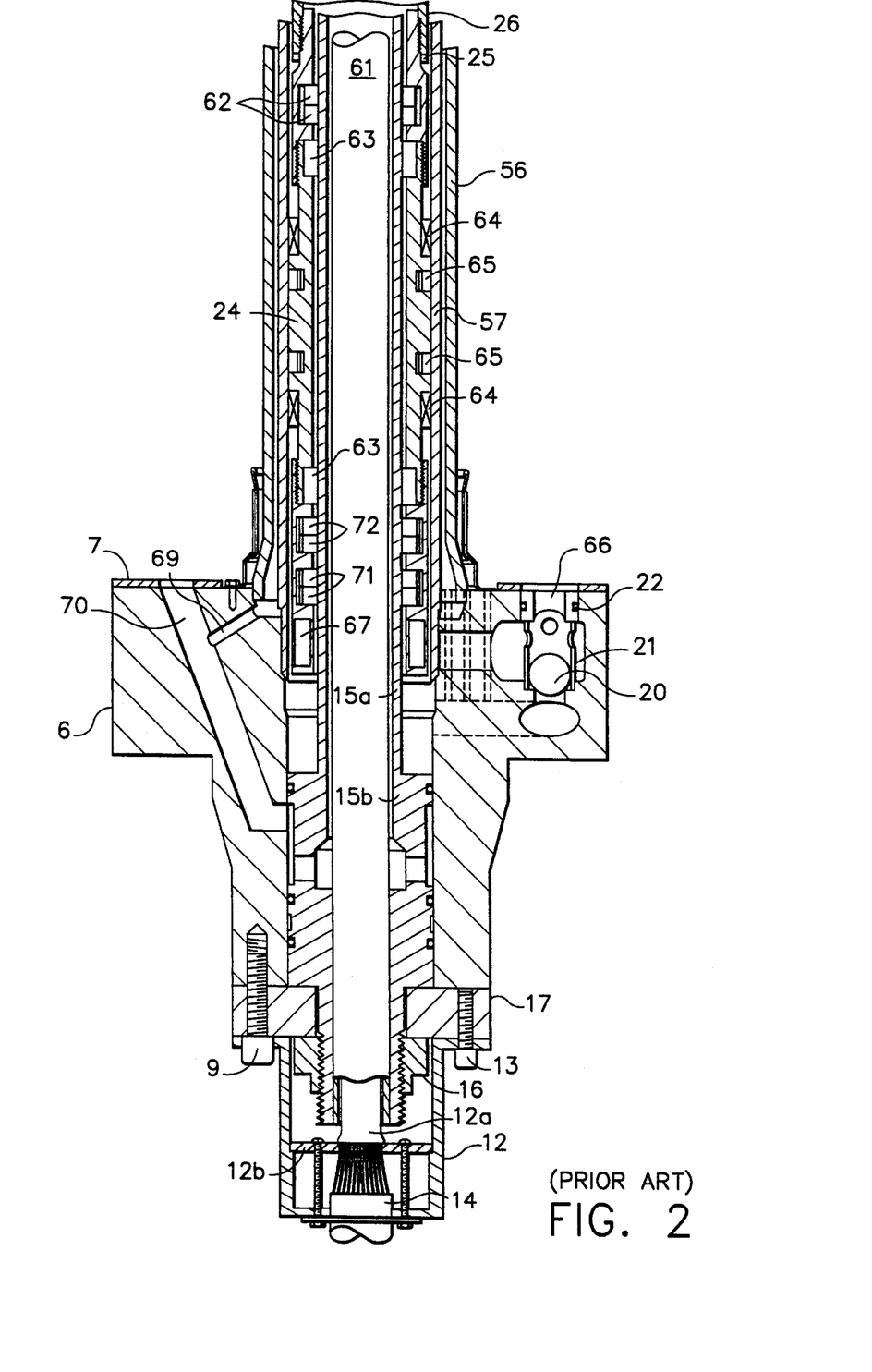
FIG. 2 is a sectional view of the lower portion of a conventional control rod drive.

Referring to FIG. 2, the CRD further comprises an inner cylinder 57 and an outer tube 56, which form an annulus under the collet piston 29b through which water is applied to the collet piston (see FIG. 1) to unlock index tube 26. The internal diameter of inner cylinder 57 is honed to provide the surface required for expanding seals 65 on the drive piston 24.

Returning to FIG. 1, welded pipes 80 and 81, installed in the CRD housing, port water to the insert port 66 and the withdraw port 70 respectively. A port 69 below outer tube 56 connects to withdraw port 70 in CRD flange 6 so that water is applied through the under-the-collet-piston annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus under the drive piston 24 and serves as the inlet for water during normal insertion or scram. Water enters this port for a brief period in response to a withdraw signal to move the index tube 26 upward so that collet fingers 29a (see FIG. 1) are cammed out. Following this brief unlocking period, water from below drive piston 24 is discharged through port 66 and through the under-piston hydraulic line for the duration of the withdraw signal.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism comprises collet fingers 29a, collet piston 29b and collet spring 31. This mechanism is the means by which index tube 26 is locked to hold the control rod at a selected position.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against a guide cap (not shown). When the withdraw signal ceases, the spring pressure forces the collet downward so that fingers 29a slip off the guide cap. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29b, providing 24 increments at which a control rod may be positioned and preventing inadvertent withdrawal of the rod from the core. The lower surfaces of the locking notches slope gradually so that the collet fingers cam outward for control rod insertion.

Figure 4:
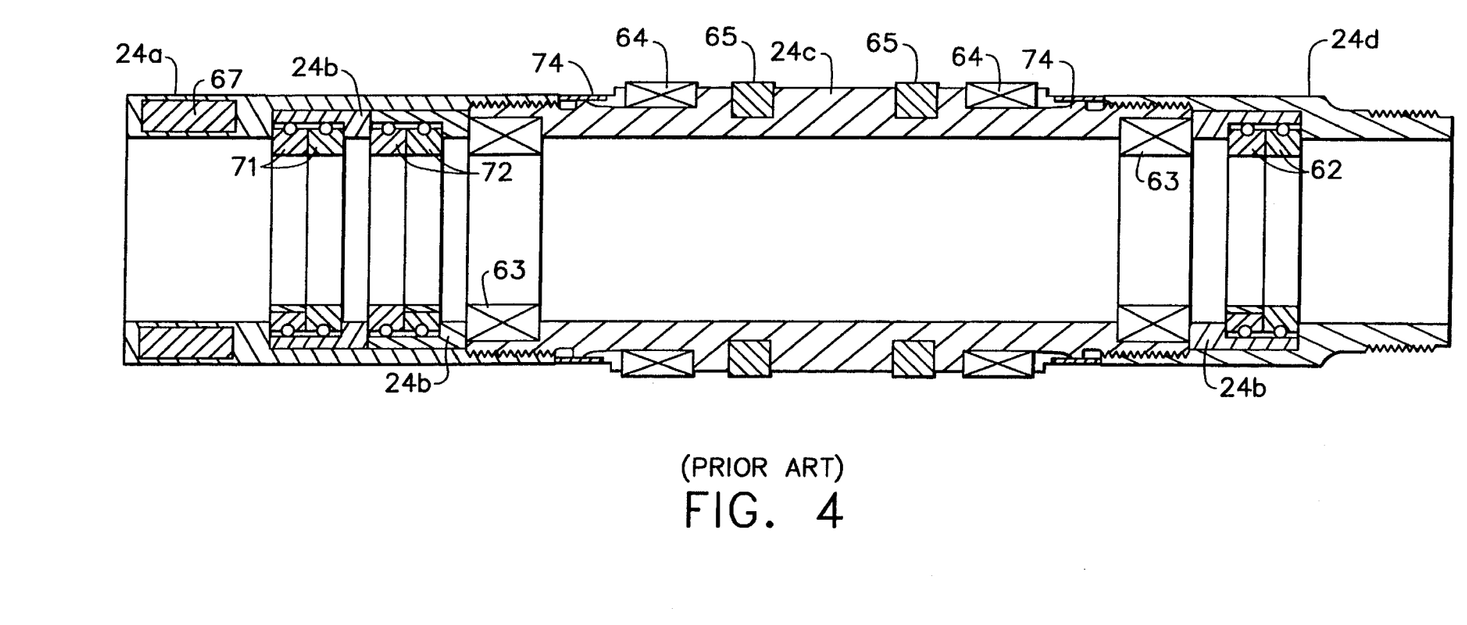
FIG. 4 is a sectional view of an assembled CRD drive piston.

The component parts of drive piston 24 are shown in FIG. 4 and include magnet housing 24a, seal cups 24b, piston coupling 24c and piston head 24d. Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively. The magnet housing 24a contains a ring magnet 67 which actuates the switches of the position indicator probe 12a to provide remote electrical signals indicating control rod position.

The piston tube assembly forms the innermost cylindrical wall of the CRD. It is a welded unit consisting of piston tube 15 and a position indicator tube 61 (see FIG. 2). The position indicator tube 61 is a pressure-containing part which forms a drywell housing for a position indicator probe 12a. Piston tube 15 provides for the porting of water to or from the upper end of the piston head portion of drive piston 24 during rod movement.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. A threaded end 15c of piston tube 15 is secured by a nut 16 at the lower end of the CRD.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to CRD ring flange 17 by screws 13. A cable clamp (not shown), located at the bottom of a receptacle 14, secures a connecting electrical cable to receptacle 14. Ring flange 17 is in turn secured to the CRD housing by screws 9. Thus, probe 12a, housing 12 and the cable clamp (with the cables passing therethrough) can be removed as a unit.

Probe 12a includes a switch support with 53 reed switches and a thermocouple for transmitting electrical signals to provide remote indications of control rod position and CRD operating temperature. The reed switches are connected by electrical wires to receptacle 14, which receives a plug (not shown). Housing 12 serves as a protective covering for the electrical wires. The reed switches are normally open and are closed individually during CRD operation by ring magnet 67 installed in the bottom of drive piston 24.

Figure 3:
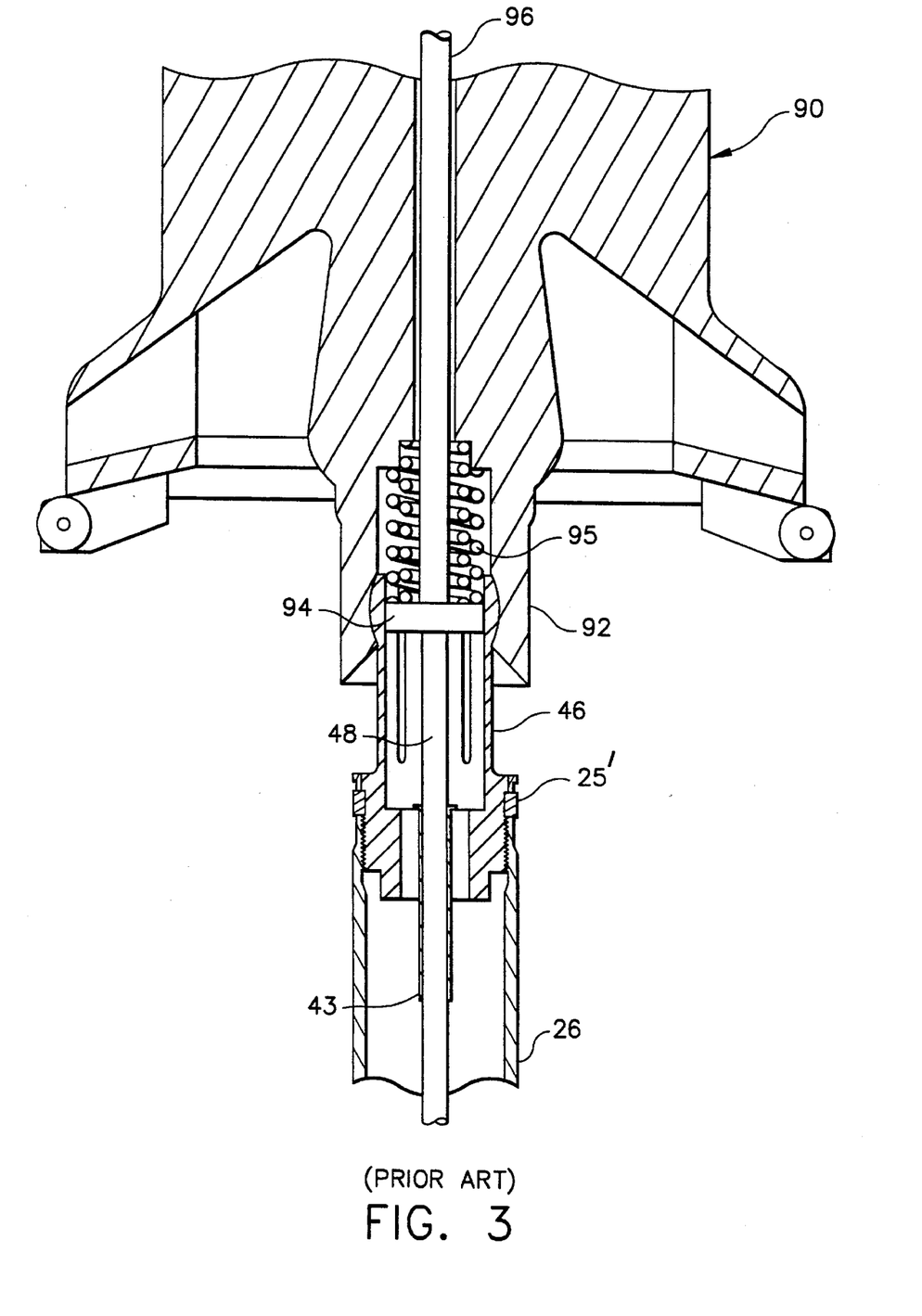
FIG. 3 is a sectional view of a conventional coupling of a control rod drive to a control rod.

As seen in FIG. 3, spud 46, which connects the control rod 90 and the CRD, is threaded onto the upper end of index tube 26 and held in place by locking band 25'. The coupling arrangement will accommodate a small amount of angular misalignment between the CRD and the control rod. Six spring fingers permit the spud to enter the mating socket 92 on the control rod. A lock plug 94 then enters spud 46 from socket 92 and prevents uncoupling.

Two uncoupling mechanisms are provided. The lock plug 94 may be raised against the return force of a spring 95 by an actuating shaft 96 which extends through the center of the control rod velocity limiter to an unlocking handle (not shown). The control rod, with lock plug 94 raised, may then be lifted from the CRD.

The lock plug may also be raised from below to uncouple the CRD from below the reactor vessel. Conventional practice is to remove the position indicator probe from the CRD prior to drive removal. The purpose is to allow access by an uncoupling tool in the space occupied by the probe. The uncoupling tool is used to uncouple the drive from the control rod from beneath the RPV. To accomplish this, an uncoupling tool is attached to the bottom of the CRD and used to raise the piston tube 15. Piston tube 15 supports an uncoupling rod 48 (shown in FIG. 3) which is welded to the flared end of a tube 43, which is in turn slidably supported in the base of spud 46.

When the control rod is in its "full-out" position, i.e., backseated position atop the guide tube (not shown), the drive piston is separated from piston head 15b by a distance of 2⅛ inches. Raising the piston tube and uncoupling rod 48 by 1⅛ inches lifts lock plug 94 out of the spud. The drive piston/index tube/spud assembly 24/26/46 is then withdrawn until the drive piston sits on the piston head 15b (i.e., a distance of 1 inch), thereby disengaging the spud from the control rod coupling socket 92 (i.e., uncoupling the control rod). The uncoupling tool is then lowered by 1⅛ inches to lower the control rod, assembly 24/26/46 and piston 15 together until piston head 15b is again backseated on the CRD ring flange 17. This is referred to as the overtravel travel position of the control rod.

Several types of uncoupling tool exist, but they share common features. For example, existing uncoupling tools comprise a probe with a magnet-actuatable switch. That switch is normally open and is closed by ring magnet 67 (see FIG. 2) when assembly 24/26/46 is withdrawn to a position reflecting uncoupling of the control rod. The proximity of the magnet in the uncoupled position actuates the switch, which in turn activates an indicator (e.g., an LED) inside the uncoupling tool. When uncoupling has been verified by activation of the indicator, the control rod drive is ready to be removed from the CRD housing flange 10a.

SUMMARY OF THE INVENTION

The present invention is a method and a gage for testing uncoupling tools to ensure proper operation prior to use. The uncoupling tool gage simulates the actual conditions under which the uncoupling tool is expected to perform.

The gage in accordance with the invention has a cylindrical guide for slidably receiving a conventional magnet housing and means for supporting the guide in a position concentric with respect to the probe of an uncoupling tool to be checked. The magnet housing is placed inside the cylindrical guide and then moved toward the bottom thereof. When the magnet moves into proximity with a switch in the uncoupling tool probe, an indicator lamp in the uncoupling tool illuminates. If the face of the magnet housing is within a range band on the outside of the guide when the indicator illuminates, then the uncoupling tool is operating properly.

DETAILED DESCRIPTION OF THE PREFERRED EMBODIMENTS

The gage in accordance with a preferred embodiment of the invention can be utilized to check the operating condition of different types of uncoupling tools. The primary function of these uncoupling tools is to indicate that the control rod has been uncoupled from the control rod drive, so that the latter can be removed.

Figure 5:
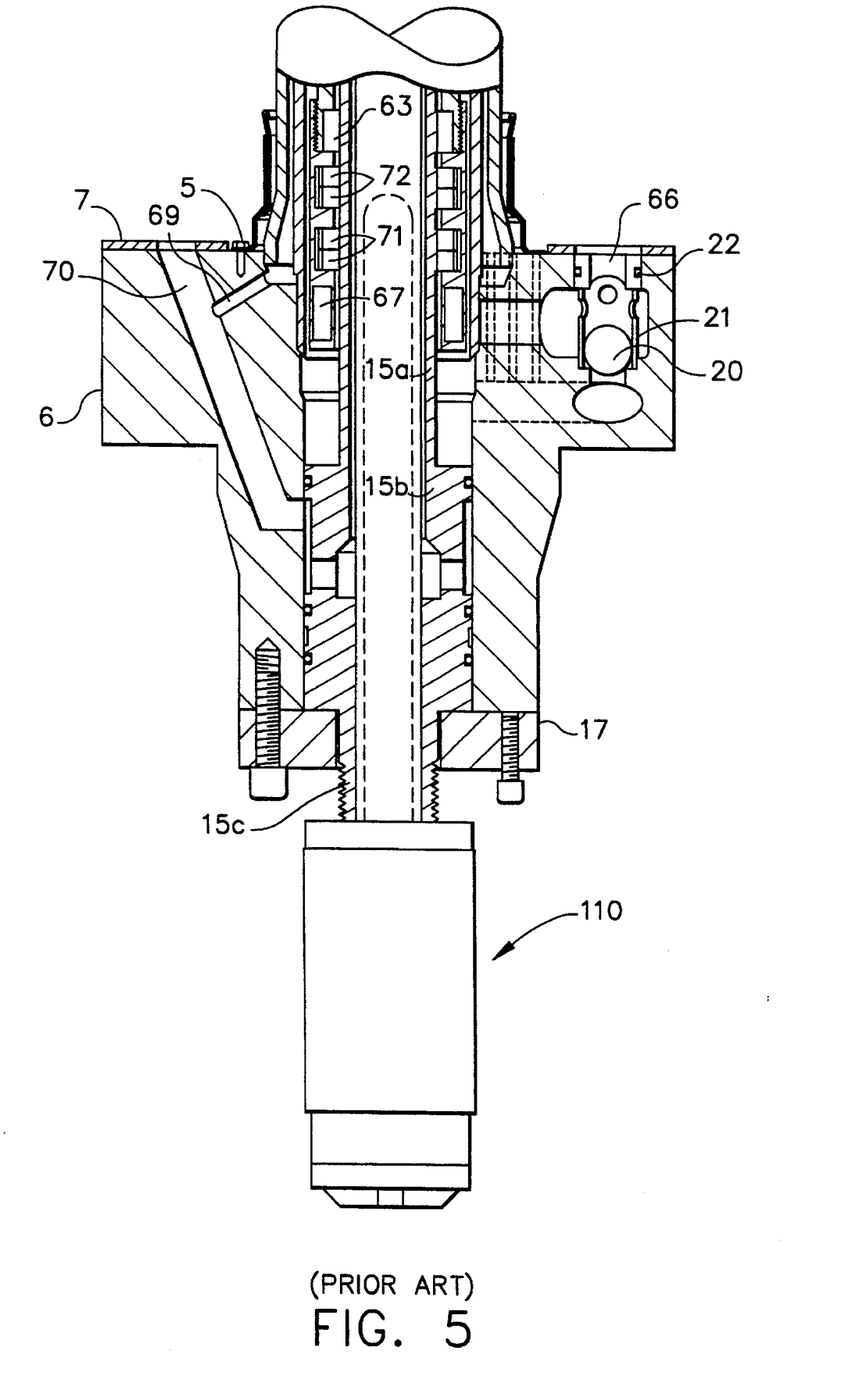
FIG. 5 is a sectional view of the lowermost portion of a conventional control rod drive with an uncoupling tool of a first type inserted in place of the position indicator probe.
Figure 6A:
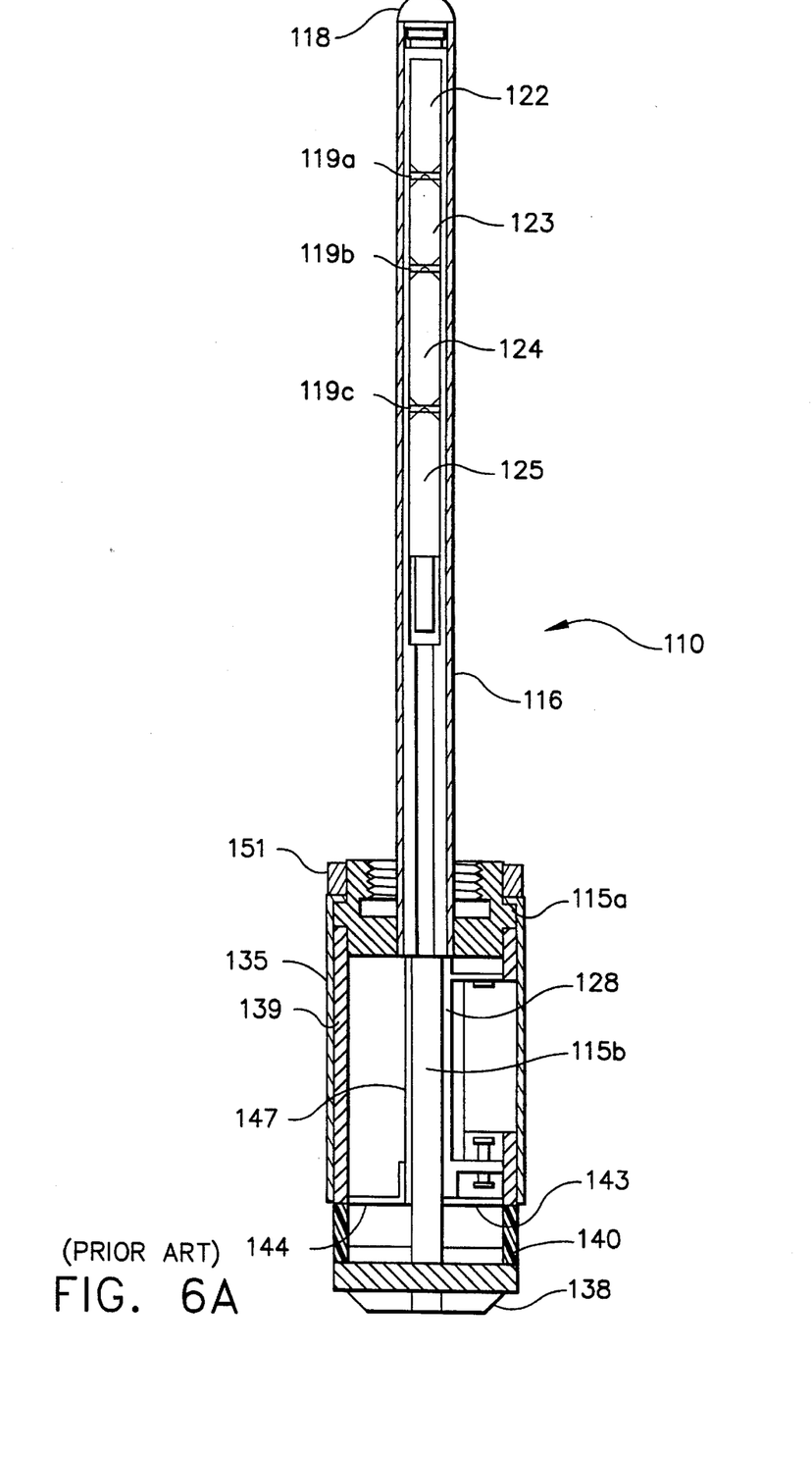
FIG. 6A is a sectional view of an uncoupling tool of the first type.

In accordance with the conventional CRD removal method, the piston nut 16 and position indicator probe 12a are removed and an uncoupling tool 110 of a first type is inserted, as shown in FIG. 5. Referring to FIG. 6A, this uncoupling tool has a probe 118 contained in a housing 116 connected to a frame base 115a. Frame base 115a has a threaded bore which screws onto the threaded end 15c of the piston tube 15, thereby coupling the uncoupling tool 110 to the CRD. The two legs of a U-shaped frame member 115b extend from frame base 115a. A base 138 is bolted to the crosspiece of frame member 115b. Base 138 couples with the drive assembly (not shown) which is used to lift the piston tube assembly during control rod uncoupling. Frame member 115b is the sole member transmitting the load from base 138 to frame base 115a.

Frame member 115b supports a battery holder 128 and a printed circuit board 147, hereinafter referred to as the "CRD position module". A housing 139 and a lamp housing 140 are held between frame base 115a and tool base 138. A plurality of indicator lamps (not shown in FIG. 6A) are electrically connected to CRD position module 147 and housed in lamp housing 140 in front of reflectors 143 and 144. Housing 139 is provided with a window for inserting batteries into battery holder 128. After battery insertion, a sleeve 135 is slid over housing 139 and O-rings and then locked into place by a locking ring 151.

Figure 6B:
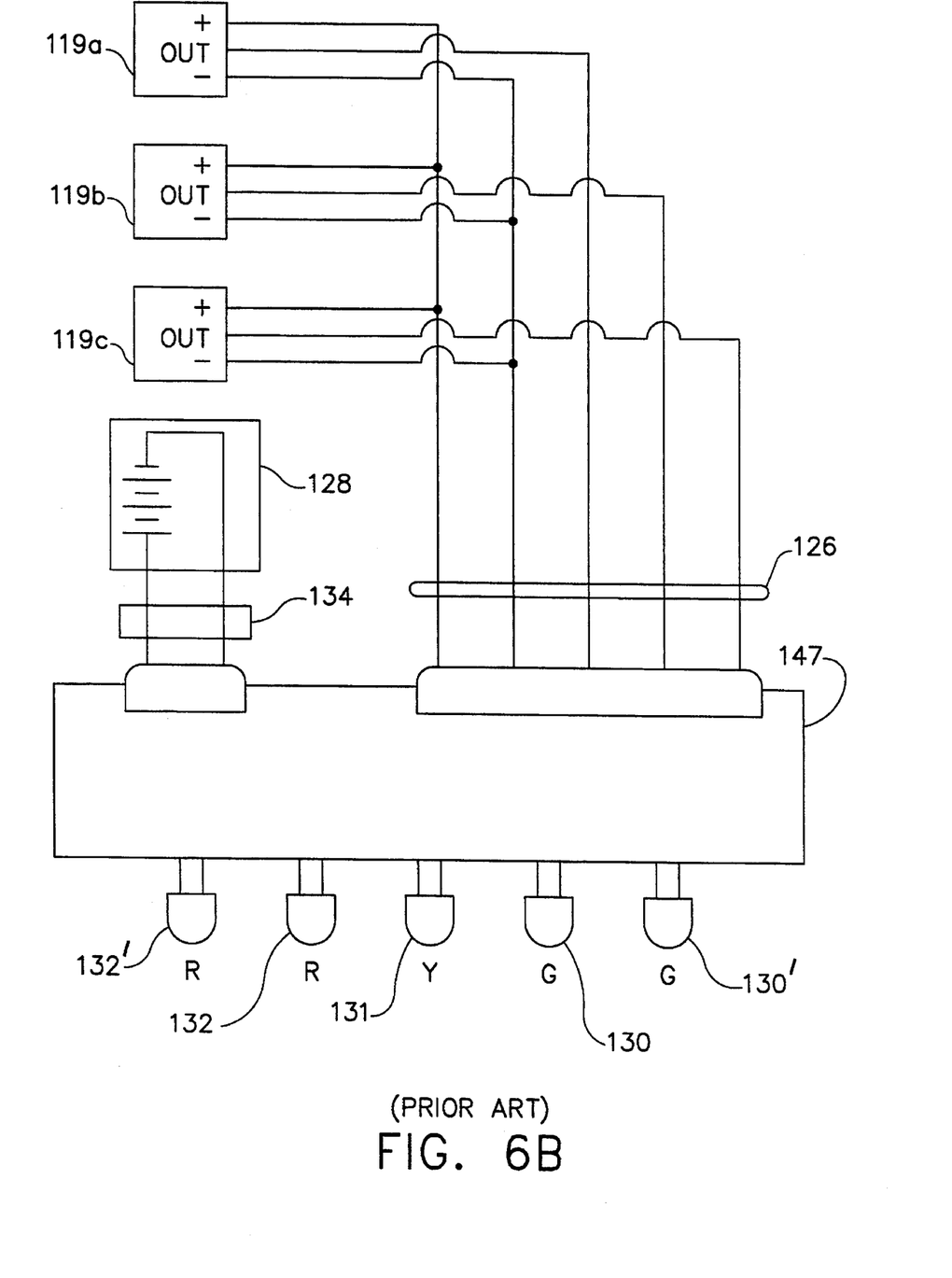
FIG. 6B is a diagram of the electronic circuitry incorporated in the uncoupling tool of the first type.

The probe 118 has three analog position sensors 119a–c mounted between spacers 122–125. Sensors 119a–c are Hall effect transistors electrically connected via a five-pin connector 126 to CRD position module 147, as shown in FIG. 6B. Each sensor outputs a voltage proportional to magnetic flux. The CRD position module is programmed to compare the voltage output by each sensor with a respective threshold voltage. Module 147 is powered via a two-pin connector 134 by a plurality of batteries held by battery holder 128.

As ring magnet 67 approaches sensor 119a, module 147 turns on a red LED 132 when the sensor output voltage exceeds a predetermined threshold. As the ring magnet is displaced further, sensor 119b outputs a voltage as well. If sensors 119a and 119b are both outputting respective voltages which exceed their respective thresholds, then module 147 continues to illuminate the red LED 132 continuously. An intermittently illuminated red LED 132' is used to indicate a low battery condition. Only when the output of sensor 119a falls below its threshold and the output of sensor 119b remains above its threshold will the red LED 132 be switched off and a yellow LED 131 be switched on. As the magnet housing is moved further down the guide bore, the voltage output by sensor 119c will eventually exceed its respective threshold, in which case module 147 turns off the yellow LED 131 and turns on a pair of green LEDs 130, 130'. Two green LEDs are provided in order to increase the intensity of the green indicator. If sensors 119b and 119c are both outputting respective voltages which exceed their respective thresholds, then module 147 will illuminate only the green LEDs. Thus, the yellow LED is lit only if both of sensors 119a and 119c are outputting voltages below their respective thresholds.

A continuously illuminated red LED indicates the control rod is in the "full out" position; two illuminated green LEDs indicate the control rod is in the "overtravel" position; and an illuminated yellow LED indicates that the control rod is in a "transition" position therebetween. A blinking red LED indicates a low battery condition. Since the limit of drive piston down travel is provided by the backseat position of the control rod in the reactor vessel guide tube, switch 119c is closed only when the control rod and CRD are uncoupled and, when closed, provides an annunciation of this condition. This condition indicates that the CRD can be safely removed from the CRD housing. The LEDs are visible through lamp housing 140, which is made of a polished transparent plastic, e.g., polycarbonate.

Figure 7:
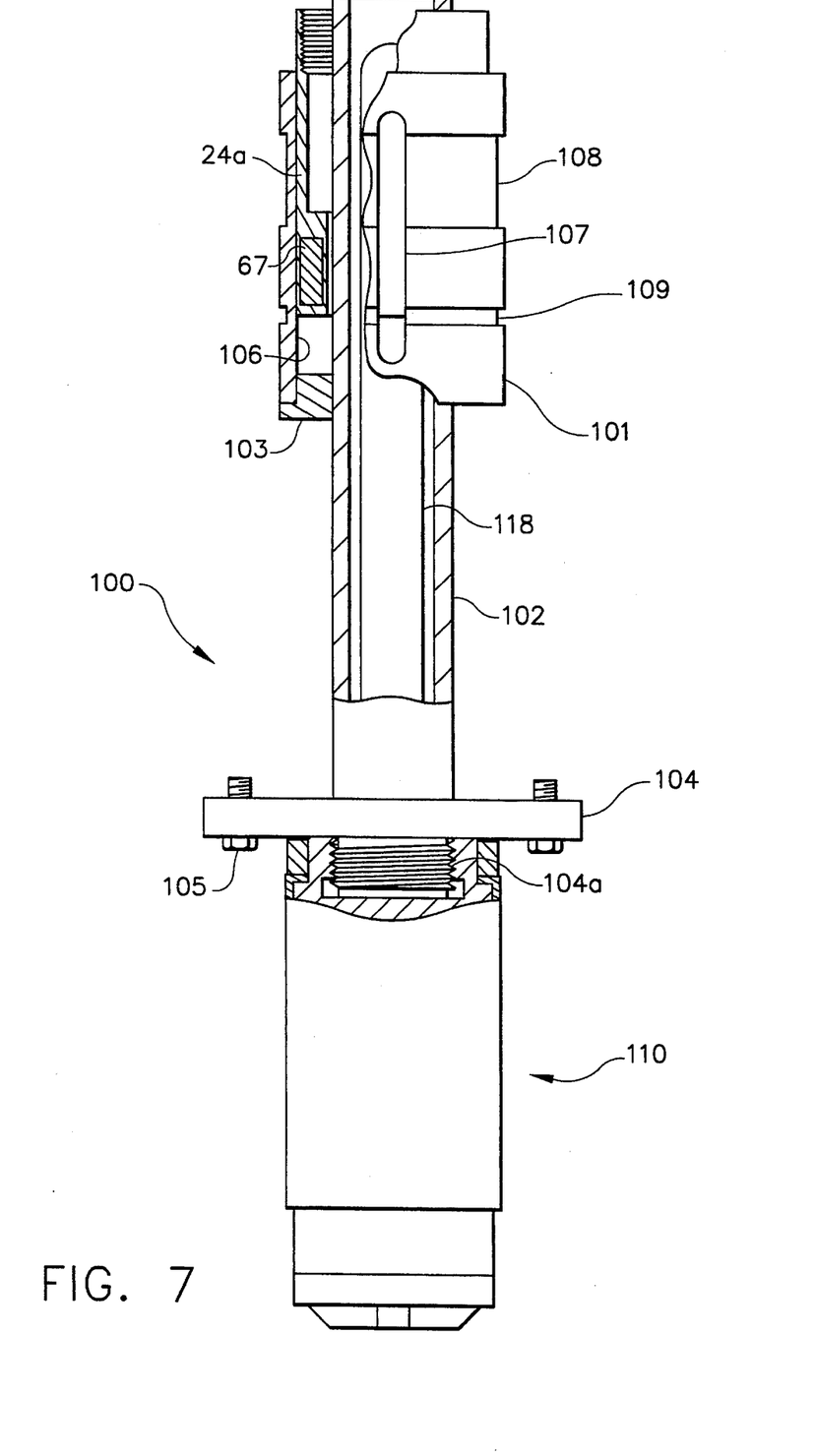
FIG. 7 is a partly sectional view of the uncoupling tool gage in accordance with the present invention with the uncoupling tool of FIGS. 6A and 6B inserted therein.

The operating condition of uncoupling tool 110 can be checked using the gage 100 seen in FIG. 7. The gage comprises a cylindrical guide 101 connected at one end to a mid-portion of a support tube 102 by an annular flange or ring 103. The guide 101 and support tube 102 are preferably concentric. Support tube 102 is supported by a gage base 104 which has a threaded cylindrical extension 104a. The threaded outer circumferential surface of extension 104a receives the threaded bore of frame base 115a of uncoupling tool 110. When the gage and tool are coupled in this way, probe 118 extends axially inside support tube 102 to an elevation where probe 118 is surrounded by guide 101.

Guide 101 has a circular cylindrical bore 106 for receiving a conventional magnet housing 24a housing a ring magnet 67. The diameter of bore 106 is slightly greater than the outer diameter of the magnet housing to enable slidable axial displacement of the housing inside the guide. Guide 101 also has an axial inspection window 107 for viewing the axial position of magnet housing 24a relative to guide 101. A pair of annular grooves 108 and 109 (hereinafter referred to as "range bands") are provided on the outer circumferential surface of guide 101, range band 108 having a width greater than that of range band 109.

To check the operation of the uncoupling tool 110, magnet housing 67 is placed inside the cylindrical guide and then moved toward the bottom thereof. When the magnet is moved into successive proximity with each Hall effect transistor 119a–c in uncoupling tool probe 118, each transistor, if functional, changes state. The switched states of the transistors are detected by the CRD position module 147 in the uncoupling tool. If the uncoupling tool is functioning properly, the CRD position module 147 will continuously activate the LEDs in succession: red first, then yellow and green last.

To confirm that the uncoupling tool is functional, the tester must view the magnet housing 24a through the inspection window 107 when the transitions from red to yellow and from yellow to green occur. If the yellow LED 131 turns on while the bottom edge of magnet housing 24a lies between the upper and lower limits of range band 108 and if the green LEDs 130, 130' turn on while the bottom edge of magnet housing 24a lies between the upper and lower limits of range band 109, then the uncoupling tool 110 is functioning properly and ready for use.

Figure 8:
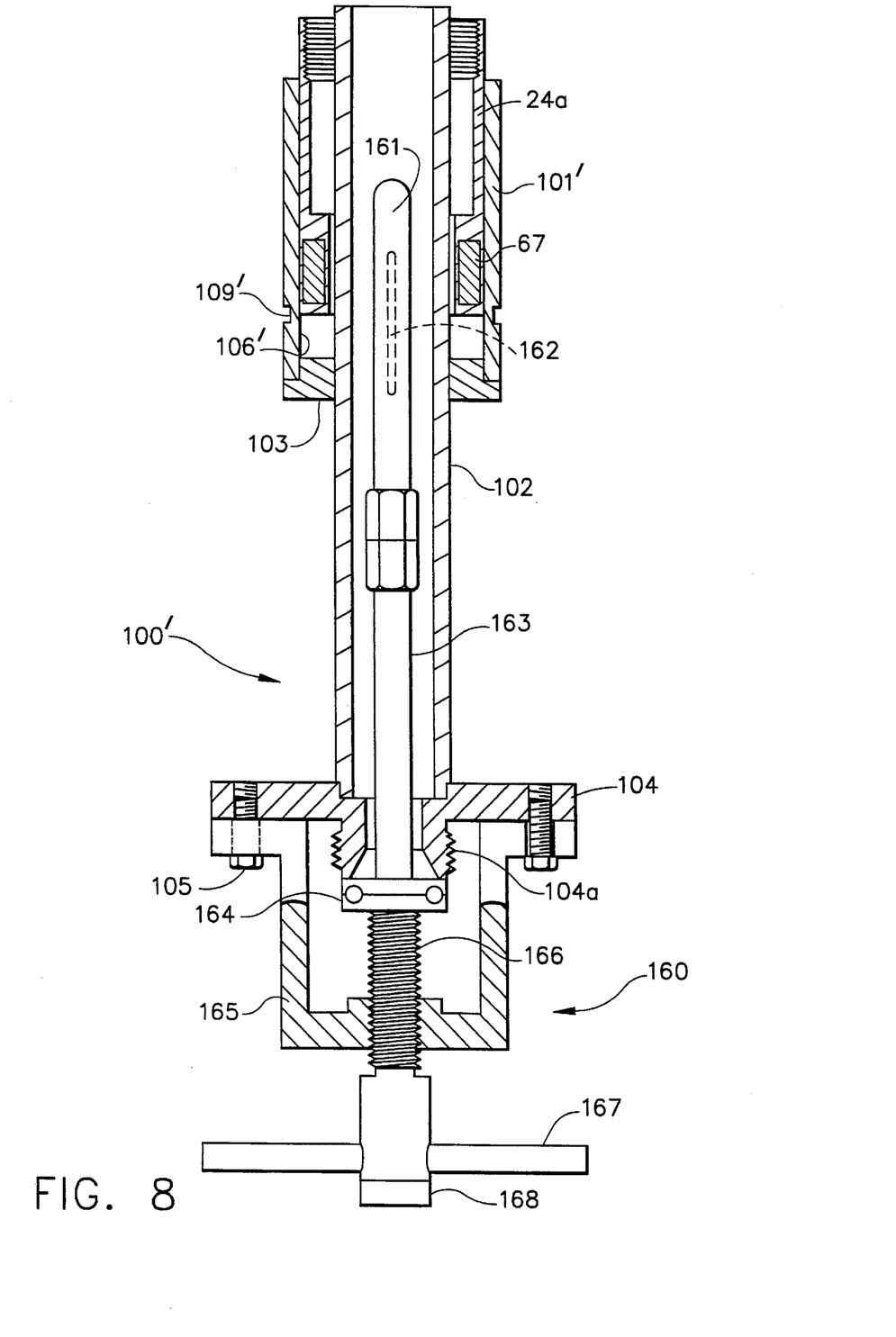
FIG. 8 is a partly sectional view of the uncoupling tool gage in accordance with the present invention with a second type of uncoupling tool inserted therein.

Use of the same gage to check operation of an uncoupling tool of a second type is shown in FIG. 8. In this instance, the uncoupling tool 160 comprises a probe 161 supported on a thrust bearing 164 via a battery housing 163. A mounting frame 165 has a threaded bore for receiving a drive screw 166, the end of which is coupled to the thrust bearing 164. To install the uncoupling tool 160 on a CRD, the mounting frame 165 is bolted to the CRD ring flange 17 (not shown). Then the drive screw is turned using handle 167 until the thrust bearing 164 bears against the bottom of threaded end 15c of piston tube 15. Further turning of handle 167 causes the thrust bearing to push the piston tube assembly up, which in turn lifts the lock plug 94 and uncouples the control rod.

The uncoupling tool has an indicator lamp in lamp housing 168 which can be illuminated by batteries in battery housing 163. If uncoupling tool 160 is functioning properly, the indicator lamp will be illuminated in response to magnet 67 causing switch 162 to change state as the drive piston assembly is withdrawn.

To test the functioning of uncoupling tool 160, either gage 100 shown in FIG. 7 or gage 100' shown in FIG. 8. Gage 100' differs from gage 100 only in that it does not have a range band 108. Referring to FIG. 8, the mounting frame 165 is bolted to gage base 104 by two bolts 105. Then drive screw 166 is turned until the thrust bearing 164 bears against the end of threaded extension 104a. With probe 161 now properly positioned inside support tube 102, the magnet housing 24a is inserted in a bore 106' in a guide 101' and slid toward the bottom thereof. If the indicator lamp on tool 160 turns on while the bottom edge of magnet housing 24a lies between the upper and lower limits of range band 109', then the uncoupling tool 160 is functioning properly and ready for use.

The preferred embodiment of the uncoupling tool gage has been disclosed for the purpose of illustration. Variations and modifications of the disclosed structure which do not depart from the concept of this invention will be readily apparent to mechanical engineers skilled in the art of tooling. All such variations and modifications are intended to be encompassed by the claims set forth hereinafter.

We claim:

1. A gage for checking the operating status of an uncoupling tool having a cylindrical probe with a magnet-actuatable switch for activating an indicator in response to actuation by a magnet, comprising:

first means for receiving an annular housing enclosing a ring magnet, wherein said first means has a circular cylindrical inner circumferential surface and is open at one end;

second means for receiving said probe of said un-coupling tool;

third means for abutting said uncoupling tool;

means for connecting said first means to said second means so that a center axis of said housing and a center axis of said probe are co-axial and one of said housing and said probe can be translated in a direction parallel to said center axis of said probe to an axial position whereat said magnet actuates said switch if said switch is in an operative state; and means for connecting said second means to said third means so that abutment of said third means with said uncoupling tool establishes a fixed spatial relationship between said first means and said probe, wherein said means for connecting said first means to said second means comprises a ring having an annular flat surface substantially perpendicular to said circular cylindrical inner circumferential surface, said annular flat surface of said ring forming a stop for said housing.

2. The gage as defined in claim 1, further comprising threaded means for threadably engaging a threaded portion of said uncoupling tool.

3. A gage for checking the operating status of an uncoupling tool having a cylindrical probe with a magnet-actuatable switch for activating an indicator in response to actuation by a magnet, comprising:

first means for receiving an annular housing enclosing a ring magnet;

second means for receiving said probe of said un-coupling tool;

third means for abutting said uncoupling tool;

means for connecting said first means to said second means so that a center axis of said housing and a center axis of said probe are co-axial and one of said housing and said probe can be translated in a direction parallel to said center axis of said probe to an axial position whereat said magnet actuates said switch if said switch is in an operative state; and means for connecting said second means to said third means so that abutment of said third means with said uncoupling tool establishes a fixed spatial relationship between said first means and said probe, wherein said first means comprises an annular groove formed on an outer surface thereof and an axial slot for determining by visual inspection the axial position of a portion of said housing relative to said annular groove.

4. A method for checking the operating status of an uncoupling tool having a cylindrical probe with a magnet-actuatable switch for activating an indicator in response to actuation by a magnet, comprising the steps of:

obtaining a magnet housing which is not coupled to a piston coupling of a drive piston;

arranging said magnet housing and said probe in mutually concentric positions; and translating one of said magnet housing and said probe in a direction parallel to a central axis of said probe to an axial position whereat said switch, if operative, will be actuated by said magnet, wherein said step of translating comprises sliding said magnet housing in a circular cylindrical guide, and further comprising the step of securing said guide in a position concentric with said probe.

5. The method as defined in claim 4 further comprising the step of forming an annular groove on an outer surface of said guide.

6. The method as defined in claim 5, further comprising the steps of:

forming an axial slot in said guide; and determining the axial position of a portion of said housing relative to said annular groove by visual inspection through said axial slot.

7. A gage comprising first and second circular cylindrical tubes, said first cylindrical tube having a length greater than a length of said second cylindrical tube, an end of said second cylindrical tube being connected to a mid-portion of said first cylindrical tube by an annular ring such that said first and second cylindrical tubes are mutually concentric and form an annular channel therebetween closed at one end by said annular ring, wherein said second cylindrical tube has an annular groove formed on an outer surface thereof and said second cylindrical tube has an axial slot for determining by visual inspection the axial position of a portion of said housing relative to said annular groove.

8. The gage as defined in claim 7, further comprising means for supporting said first cylindrical tube, and threaded means supported by said supporting means for threadably engaging a threaded device to be checked by said gage.

* * * * *